(12) United States Patent
Ihlefeld et al.

(10) Patent No.: US 8,877,388 B1
(45) Date of Patent: Nov. 4, 2014

(54) SOLID-STATE LITHIUM BATTERY

(75) Inventors: Jon Ihlefeld, Albuquerque, NM (US); Paul G. Clem, Albuquerque, NM (US); Cynthia Edney, Sandia Park, NM (US); David Ingersoll, Albuquerque, NM (US); Ganesan Nagasubramanian, Albuquerque, NM (US); Kyle Ross Fenton, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 251 days.

(21) Appl. No.: 13/478,766

(22) Filed: May 23, 2012

Related U.S. Application Data

(63) Continuation-in-part of application No. 12/690,189, filed on Jan. 20, 2010, now abandoned.

(60) Provisional application No. 61/521,118, filed on Aug. 8, 2011.

(51) Int. Cl.
    *H01M 10/0562* (2010.01)

(52) U.S. Cl.
    USPC .......................... 429/305; 429/304; 429/322

(58) Field of Classification Search
    USPC ................................................. 429/321–322
    See application file for complete search history.

(56) References Cited

U.S. PATENT DOCUMENTS

| | | | |
|---|---|---|---|
| 6,982,132 B1 | 1/2006 | Goldner et al. | |
| 7,901,658 B2 | 3/2011 | Weppner et al. | |
| 2003/0228513 A1* | 12/2003 | Wei et al. | 429/38 |
| 2008/0032236 A1 | 2/2008 | Wallace et al. | |

OTHER PUBLICATIONS

Ihlefeld, Jon F., Paul G Clem, Barney L. Doyle, Paul F. Kotula, Kyle R. Fenton, and Christopher A. Apblett. "Fast Lithium-Ion Conducting Thin-Film Electrolytes Integrated Directly on Flexible Substrates for High-Power Solid-State Batteries." Advanced Materials 23.47 (2011): 5663-667.*

Ihlefeld, Jon, Brian Laughlin, Alisa Hunt-Lowery, William Borland, Angus Kingon and Jon-Paul Maria. "Copper Compatible Barium Titanate Thin Films for Embedded Passives." Journal of Electroceramics 95-102 (2005): 95-102.*

Kawai, Hiroo, and Jun Kuwano. "Lithium Ion Conductivity of A-Site Deficient Perovskite Solid Solution La0.67-xLi3xTiO3." Journal of the Electrochemical Society 141.7 (1994): L78-L79.*

J. Schwenzel et al., Developments of High-Voltage All-Solid-State Thin-Film Lithium Ion Batteries, www.sciencedirect.com, Journal of Power Sources 154 (2006), pp. 232-238.

Y. Inaguma et al., High Ionic Conductivity in Lithium Lanthanum Titanate, Solid State Communications, vol. 86, No. 10 (1993), pp. 689-693 (Pergamon Press Ltd, Great Britain).

K. Mizumoto and S. Hayashi, Lithium Ion Conduction in A-Site Deficient Perovskites R1/4Li1/4TaO3 (R=La, Nd, Sm and Y), Solid State Ionics 116 (1999), pp. 263-269.

(Continued)

*Primary Examiner* — Kenneth Douyette
*Assistant Examiner* — James Lee
(74) *Attorney, Agent, or Firm* — Kevin W. Bieg

(57) ABSTRACT

The present invention is directed to a higher power, thin film lithium-ion electrolyte on a metallic substrate, enabling mass-produced solid-state lithium batteries. High-temperature thermodynamic equilibrium processing enables co-firing of oxides and base metals, providing a means to integrate the crystalline, lithium-stable, fast lithium-ion conductor lanthanum lithium tantalate ($La_{1/3-x}Li_{3x}TaO_3$) directly with a thin metal foil current collector appropriate for a lithium-free solid-state battery.

10 Claims, 9 Drawing Sheets

(56) References Cited

OTHER PUBLICATIONS

K. Mizumoto and S. Hayashi, Crystal Structure and Lithium Ion Conductivity of A-Site Deficient Perovskites La1/3—xLi3xTaO3, Journal of the Ceramic Society of Japan, 105, 8 (1997), pp. 713-715.

K. Mizumoto and S. Hayashi, Lithium Ion Mobility and Activation Energy for Lithium Ion Conduction in A-Site Deficient Perovskites La1/3—xLi3xTaO3, Journal of the Ceramic Society of Japan, 106, 4 (1998), pp. 369-371.

K. Mizumoto and S. Hayashi, Conductivity Relaxation in Lithium Ion Conductors with the Perovskite-Type Structure, Solid State Ionics 127 (2000), pp. 241-251.

S. Arakawa, et al., Synthesis of Lanthanum Lithium Tantalate Powders and Thin Films by the Sol-Gel Method, Journal of Crystal Growth 231 (2001), pp. 290-294.

R.H. Lamoreaux and D.L. Hildenbrand, High Temperature Vaporization Behavior of Oxides. I. Alkali Metal Binary Oxides, J. Phys. Chem. Ref. Data, vol. 13, No. 1 (1984), pp. 151-173.

K-Y. Yang and K-Z. Fung, Effect of Li+ Addition on Crystal Structure and Electrical Conduction of Highly Defective La1/3NbO3 Perovskite, Journal of Physics and Chemistry of Solids 69 (2008), pp. 393-399.

\* cited by examiner

SOLID-STATE LITHIUM BATTERY

CROSS-REFERENCE TO RELATED APPLICATIONS

This application is a continuation-in-part of U.S. application Ser. No. 12/690,189, filed Jan. 20, 2010, and claims the benefit of U.S. Provisional Application No. 61/521,118, filed Aug. 8, 2011, both of which are incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to solid-state batteries and, in particular, to a solid-state lithium battery and a method for thin-film lithium-ion electrolyte fabrication for use in such solid-state lithium batteries.

BACKGROUND OF THE INVENTION

A battery is an electrochemical device that converts the energy released in a chemical reaction directly into electrical energy. In a battery, the reactants are stored close together within the battery itself, whereas in a fuel cell the reactants are stored externally. The attractiveness of batteries as an efficient source of power is that the conversion of chemical energy to electrical energy is potentially 100% efficient, although the loss due to internal resistance is a limiting factor. This potential efficiency is considerably greater than the conversion of thermal energy to mechanical energy as used in internal combustion engines, which always results in heat transfer losses. Moreover, the additional disadvantages of contaminants emitted into the atmosphere as byproducts of incomplete combustion and the dwindling availability of fuel supplies have intensified research into batteries as an alternative source of energy.

Thin-film battery technology is seen as having several advantages over conventional battery technology in that battery cell components can be prepared as thin, e.g. 1 micron, sheets built up in layers using techniques common to the electronics industry. The area of the sheets can be varied from sizes achievable with present lithographic techniques to a few square meters, providing a wide range in battery capacity. Deposition of thin films places the anode close to the cathode resulting in high current density, high cell efficiency and a great reduction in the amount of reactants used. This is because the transport of ions is easier and faster in thin film layers since the distance the ions must move is lessened.

A thin film battery typically comprises a cathode current collector deposited on a substrate and upon the cathode current collector is deposited a cathode. An electrolyte is deposited onto the cathode and an anode and anode current collector are subsequently and sequentially deposited on the electrolyte. Alternatively, the layer depositions can be reversed. The thin films are typically formed by standard thin film fabrication processes, including physical and chemical vapor deposition methods, sputtering and electroplating.

An all-solid-state high-voltage lithium or lithium-ion secondary battery has potentially superior properties compared to conventional liquid/gel based batteries. All-solid-state lithium batteries are leak proof, exhibit high safety performance, are mechanically robust and can be used over a wide range of temperature. Solid-state batteries are considered very safe as they involve no liquid or organic materials. Such batteries can have a wide temperature range of operation because of the materials involved. They can also exhibit high power as well as high capacity, combined with a low self-discharge rate and without electrolyte leakage. Solid-state inorganic electrolytes have high decomposition voltages up to about 6V against lithium metal and can be, accordingly, employed together with high-voltage lithium cathode materials. For example, lithium phosphorous oxy-nitrides $Li_{3-x}PO_{4-y}N_y$ (LiPON) and garnet-like structure $Li_6BaLa_2Ta_2O_{12}$ exhibit high ionic conductivity and high electrochemical stability at room temperature.

In general, solid lithium electrolytes have a transference number of the lithium ions of 1. This is in contrast to common liquid and polymeric electrolytes, where both cations and anions are mobile. Often, transference numbers of the lithium ions are much smaller than those of the anions. This high mobility of ions other than lithium may lead more readily to the formation of solid electrolyte interfacial (SEI) layers, which may cause deterioration and limit the life-time of the batteries. The negligible mobility of ions other than the electroactive ones in the solid state may provide a superior chemical stability. Depending on the lithium activity, however, electronic species may become important at high and low lithium activities. It should be also mentioned that all solid-state batteries will have low gravimetric energy density due to the low weight of the packaging materials compared to conventional rocking-chair batteries.

One problem encountered in the use of solid-state thin film batteries is the fracturing of the films due to stresses caused by expansion and shrinkage during the charge-discharge cycles using standard materials in the thin film. Useful would be a thin film solid-state battery that incorporates materials that do not exhibit significant stresses during the charge-discharge cycles as well as battery geometries that mitigate such effects.

Therefore, high lithium-ion conductivity thin film electrolytes for solid-state lithium batteries are desired for reduced package size, increased safety, and enhanced power and energy density. There have been extensive efforts to develop solid-state lithium-ion conductors appropriate for integration as electrolytes, including several candidate materials possessing room temperature ionic conductivities of up to $10^{-3}$ S $cm^{-1}$. See Y. Inaguma et al., *Solid State Commun.* 86, 689 (1993). In spite of these high reported conductivity values, many of these compositions suffer from issues that prevent their use in lithium-ion cells. For example, $(Li,La)TiO_3$ and $Li_{1.3}Al_{0.3}Ti_{1.7}(PO_4)_3$ both display high ionic conductivities but are unstable in contact with lithium metal due to facile $Ti^{4+}$ reduction. See V. Thangadurai et al., *J. Am. Ceram. Soc.* 86, 437 (2003). Owing to its stability in contact with lithium, ease of manufacture, and outstanding cyclability, the most widely used solid electrolyte films are based on amorphous LiPON compositions. See N. J. Dudney, *Electrochem. Soc. Interface* 17, 44 (2008). In this system, modest room temperature ionic conductivities of ca. $10^{-6}$ S $cm^{-1}$ can be achieved through processing conditions compatible with many packaging embodiments. See X. H. Yu et al., *J. Electrochem. Soc.* 144, 524 (1997). In spite of the success and widespread use of LiPON in thin film solid-state batteries, there is still a strong desire to develop lithium-stable, higher-conductivity electrolytes with similar processing advantages, but with the potential to enable energy storage devices with greater power.

High lithium-ion conductivities have been observed in the A-site deficient perovskite (general formula $ABO_3$) $La_{1/3-x}Li_{3x}TaO_3$ (referred to hereinafter as LLTO), which is isostructural with the well-known fast lithium-ion conducting $La_{2/3-x}Li_{3x}TiO_3$. Lanthanum lithium tantalate perovskites offer the possibility of room temperature ionic conductivities up to $10^{-4}$ S cm$^{-1}$ with a valence stable B-site cation, tantalum. See K. Mizumoto, and S. Hayashi, *J. Ceram. Soc. Jpn.* 105, 713 (1997); K. Mizumoto and S. Hayashi, *J. Ceram. Soc. Jpn.* 106, 369 (1998); K. Mizumoto and S. Hayashi, *Solid State Ionics* 116, 263 (1993); and K. Mizumoto and S. Hayashi, *Solid State Ionics* 127, 241 (2000). Thin films of $La_{1/3-x}Li_{3x}TaO_3$ (x=0.06) have been prepared via a sol-gel method on $SiO_2$ and single-crystalline $SrTiO_3$ substrates, but required processing to temperatures in excess of 900° C. and oxidizing atmospheres to realize high conductivities. See S. Arakawa et al., *J. Cryst. Growth* 231, 290 (2001). While successful in achieving the appropriate phase and high ionic conductivities, the use of these insulating, refractory, and expensive substrates limits commercial viability and the potential range of applications. Additionally, the necessary high-temperatures and oxidizing atmospheres used during the processing steps to crystallize $La_{1/3-x}Li_xTaO_3$ are generally incompatible with standard solid-state cell embodiments, which utilize lithium metal anodes, copper current collectors, and nano-crystalline cathodes. A method to circumvent processing temperature and atmosphere limitations has been developed in 'lithium-free' cells whereby heterostructures of an electrolyte processed directly on a cathode are prepared. See B. J. Neudecker et al., *J. Electrochem. Soc.* 147, 517 (2000). In these cells the first charge cycle can be used to plate lithium metal at the electrolyte-anode current collector interface and thereby avoid the tight processing controls necessary to deposit and handle metallic lithium. By reversing the battery stacking sequence and depositing the electrolyte first and capping with a cathode a hermetically sealed cell can be formed. See S. H. Lee et al., *Electrochem. Solid State Lett.* 6, A275 (2003). Additionally, this preparation sequence provides a means to prepare solid electrolytes requiring high processing temperatures while avoiding potential degradation of the cathode material.

While many solid-state battery technologies utilize rigid substrates, the use of a thin and flexible substrate is advantageous for reel-to-reel manufacturing, flexible electronics, and for applications requiring low profiles. Solid-state lithium-ion batteries have previously been prepared on flexible substrates, including 80 μm thick aluminum foil, using sputter-deposited LiPON as an electrolyte. See S. H. Lee et al., *Electrochem. Solid State Lett.* 2, 425 (1999). This cell utilized low temperature physical vapor deposited components to maintain nano-crystalline anodes and cathodes and to prevent deterioration of the aluminum foil substrate when exposed to oxidizing atmospheres at high temperatures. Thus, this substrate material limits the allowable thermal budget and precludes the use of most crystalline oxide electrolytes.

Therefore, a need remains for a method to fabricate lanthanium-lithium-based electrolytes on flexible metal substrates.

SUMMARY OF THE INVENTION

The present invention is directed to a method for fabricating a perovskite lanthanum lithium tantalate electrolyte layer on a metal substrate comprising depositing a precursor lanthanium lithium tantalate film on a metal substrate; and annealing the film at a crystallization temperature and oxygen partial pressure sufficiently high that the lanthanum, lithium, and tantalum are stable as oxides but low enough that the metal substrate remains metallic to provide a lanthanum lithium tantalate electrolyte layer on a metal substrate. The lanthanium lithium tantalate electrolyte layer can comprise perovskite $La_{1/3-x}Li_{3x}TaO_3$. The depositing step can comprise a chemical solution method or sputtering. The precursor lanthanium lithium tantalate film can comprise excess lithium to compensate for lithium loss during the annealing step. For example, the metal substrate can comprise copper or nickel. The crystallization temperature can typically be between 500° C. and 1200° C., and preferably about 900° C. or greater.

The invention is further directed to a solid-state lithium battery comprising a metallic anode current collector layer, a perovskite lanthanum lithium tantalate electrolyte layer on the metallic anode current collector layer, a cathode layer on the electrolyte layer, and a cathode current collector layer on the cathode layer. The battery can further comprise a lithium metal anode layer between the electrolyte layer and the metallic anode current collector layer. For example, the metallic anode current collector layer can comprise copper or nickel. The battery can be an embedded battery, a microbattery, or rolled in a standard cell.

By combining the equilibrium processing schemes conventional to dielectric co-firing with fast lithium-ion conducting materials, lithium-ion electrolytes that are traditionally only prepared on rigid refractory substrates in oxidizing atmospheres can be prepared on a commercially viable flexible substrate. This enables the preparation of a lithium-stable, non-hygroscopic lithium-ion electrolyte with a room temperature conductivity 15× higher than that of the most common solid electrolyte, LiPON. Furthermore, the invention enables the use of inexpensive flexible metal foil substrates with fast-ion conductors in electrochemical storage devices with a very low form factor and improved power over conventional materials.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
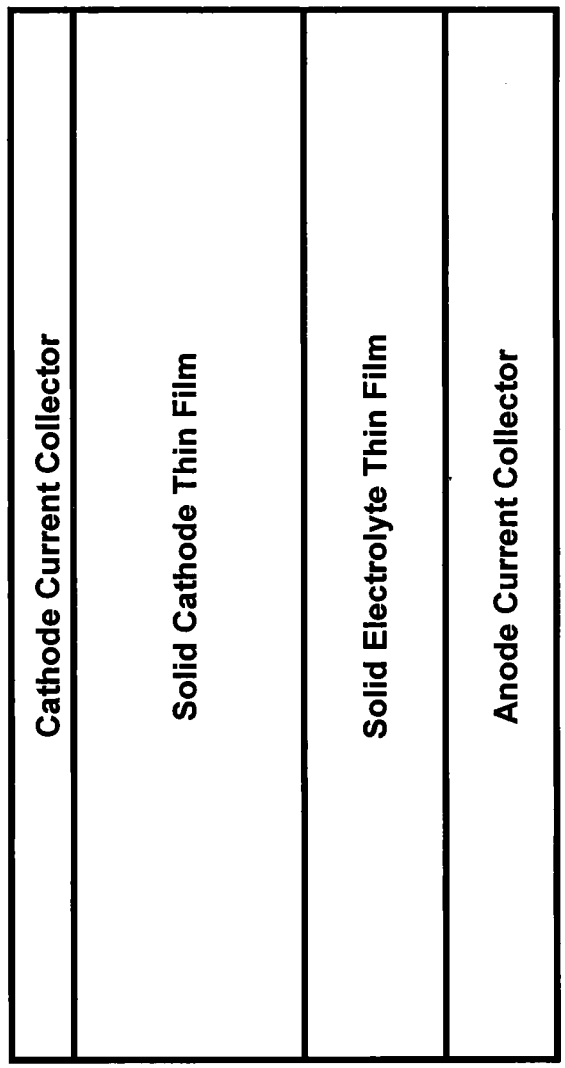
FIG. 1 is a schematic illustration of a solid-state lithium microbattery.

As shown in FIG. 1, a solid-state lithium microbattery can comprise a thin film of a first nonaqueous material, such as copper or nickel, that functions as an anode current collector, upon which is deposited optionally a thin-film anode (not shown) comprising a nonaqueous material such as lithium or lithium titanate, upon which is a nonaqueous solid electrolyte thin film layer that comprises a lithium-rare earth metal-containing compound. A solid nonaqueous cathode thin film is layered on top of the electrolyte thin film layer, followed by a nonaqueous thin film cathode current collector, such as an aluminum layer. Optionally, a separator membrane (not shown) can be between layers, such as between the nonaqueous electrolyte thin film layer and the solid cathode thin film layer.

The anode current collector can comprise a thin film of copper or nickel that is in one embodiment approximately 0.2 to approximately 5 microns in thickness or in another embodiment a tape or foil with a thickness ranging from approximately 2 microns to approximately 1 millimeter in thickness.

The solid electrolyte thin-film layer can comprise a lithium-rare earth metal-containing compound selected from a lithium-rare earth metal-metal oxide, where the metal oxide is selected from a tantalate, a niobate, a hafnate and a zirconate. The rare earth metals are defined herein as comprising lanthanum (La), cerium (Ce), praseodymium (Pr), neodymium (Nd), promethium (Pm), samarium (Sm), europium (Eu), gadolinium (Gd), terbium (Tb), ytterbium, (Yb), lutetium (Lu), yttrium (Y) and scandium (Sc). The nonaqueous electrolyte thin-film materials can be lithium-rare earth metal-metal oxide compounds that include $Li_5Ln_3Ta_2O_{12}$, $Li_7Ln_3Zr_2O_{12}$ (LLZO), $Li_7Ln_3Hf_2O_{12}$ and $Li_5Ln_3Nb_2O_{12}$, where Ln is a metal selected from the group consisting of lanthanum, cerium, praseodymium, neodymium, samarium, europium, gadolinium, terbium, terbium, ytterbium, lutetium, yttrium and scandium. Exemplary lithium-containing compounds that have been prepared as thin films include $Li_5La_3Ta_2O_{12}$, $La_{1/3-x}Li_{3x}TaO_3$, $Li_7La_3Zr_2O_{12}$, and $Li_5La_3Nb_2O_7$. These lithium-rare earth metal-metal oxide compounds can also be doped with other one or more metals, such as barium, magnesium, calcium and strontium to produce a lithium-rare earth metal-dopant metal-metal oxide compound such as $Li_6BaLa_2Ta_2O_{12}$ (LBLTO). For example, the thin film layer can be between approximately 20 nm thick and approximately 10 microns thick. Multiple rare earth metals can also be used.

The solid cathode thin film layer can comprise a compound selected from $LiCoO_2$, $LiMn_2O_4$ and $LiFePO_4$ (or more generally, $LiFe_xPO_y$, where x+y is between 4 and 6). This thin film layer is generally between approximately 20 nm thick and approximately 100 microns thick. Nanoporous carbon or carbon nanotubes can be added to improve electrical conductivity and maintain maximum capacity.

The cathode current collector can comprise a conducting material that forms a passivating oxide, such as aluminum or stainless steel. The cathode current collector and the bottom anode current collector, comprising nickel or copper, can generally be less than five microns in thickness.

For stability and other purposes, the solid-state lithium microbattery can be disposed on a substrate which can be an insulator, a semiconductor, or a conductor. The substrate should also have sufficient mechanical strength to support the thin films during processing or operational temperatures. For example, the substrate can comprise silicon, silicon dioxide, aluminum oxide, titanium, or a polymer. Alternatively, the solid-state lithium battery can be disposed a flexible substrate, such as a metal foil.

In one embodiment, a lithium-lanthanum-tantalate based film is deposited in the amorphous state by solution deposition, sputtering or other methods and annealed at high temperature on a copper or nickel substrate, without oxidation of the metal substrate. The cathode material, such as $LiCoO_2$ or $LiFePO_4$, is deposited on top of the lithium-lanthanum-tantalate based film. This copper/tantalate/cathode material can be wound with an aluminum current collector to develop a cylindrical battery or deposited as a thin film battery. Important is the integration of a conductive, crack-free electrolyte (Li ion conductive) film with correct crystalline phase atop a copper substrate. Growth of a highly conductive solid electrolyte directly on copper has not been previously demonstrated. This deposition has been accomplished in this invention without interfacial oxidation of the copper through the use of a reducing atmosphere during the deposition process.

Figure 2:
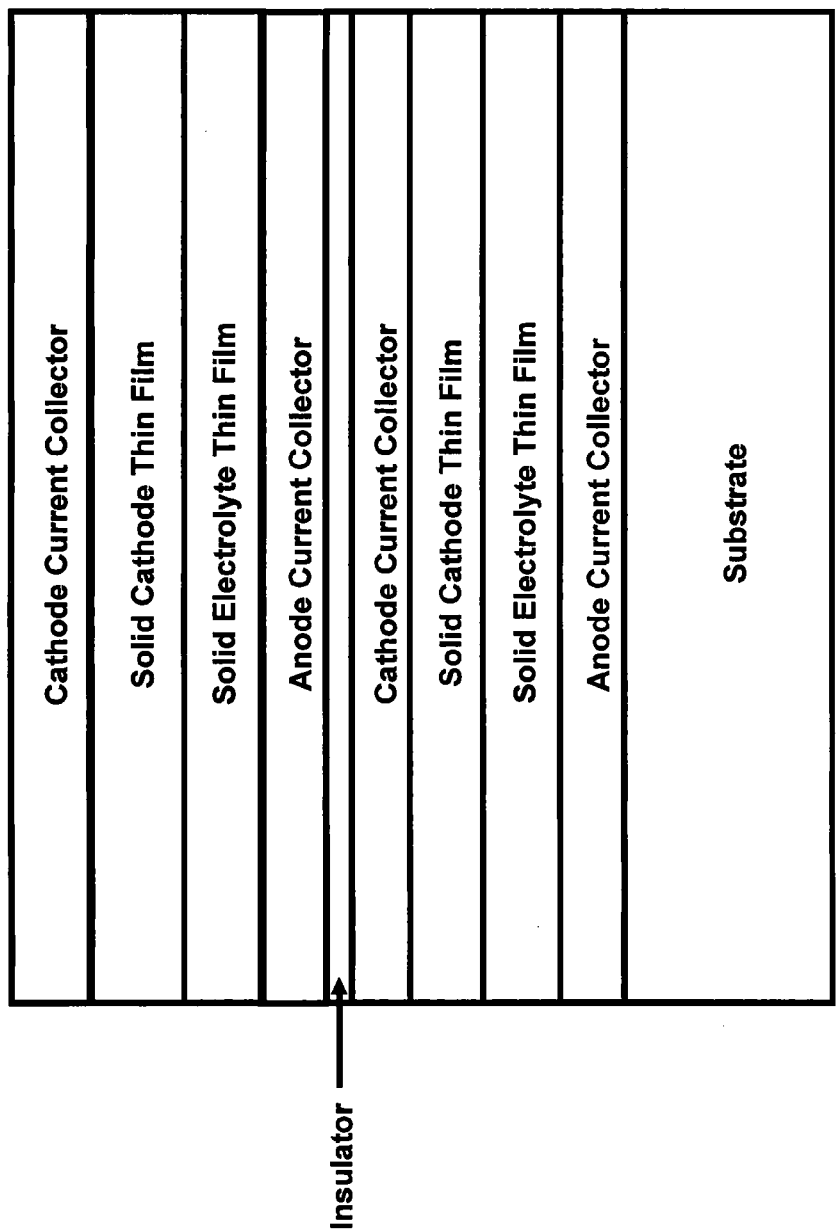
FIG. 2 is a schematic illustration of a stacked solid-state lithium microbattery structure.

The present invention can also be a stacked solid-state battery comprising multiple microbatteries as previously described. In one embodiment, two or more layered microbatteries of the general structure depicted in FIG. 1 are stacked with an insulating layer separating the adjacent microbatteries. The insulating layer comprises a material selected from $SiO_2$, $Al_2O_3$, $HfO_2$, $ZrO_2$, $Y_2O_3$, $TiO_2$, and $Ln_2O_3$, wherein Ln is at least one lanthanide element. FIG. 2 depicts a stacked solid-state microbattery structure, for example comprising an aluminum thin film deposited on a cathode selected from $LiFePO_4$ or $LiCoO_2$, which is deposited on a Li-containing electrolyte thin film layer deposited on a thin film of copper, which is repeatedly stacked with an insulating layer provided between each microbattery stack. The stack can be put on a substrate as desired. The embodiment depicted in FIG. 2 illustrates a stacked solid-state battery that can comprise, for example, a first layer of a $SiO_2$ substrate, upon which is disposed a first layered microbattery comprising a thin copper current collector layer, upon which is disposed a thin film of the electrolyte LBLTO, upon which is disposed a cathode layer comprising $LiFePO_4$, upon which is disposed an aluminum current collector layer, upon which is disposed the insulating layer and upon which is disposed a similarly-structured second layered microbattery.

Figure 3:
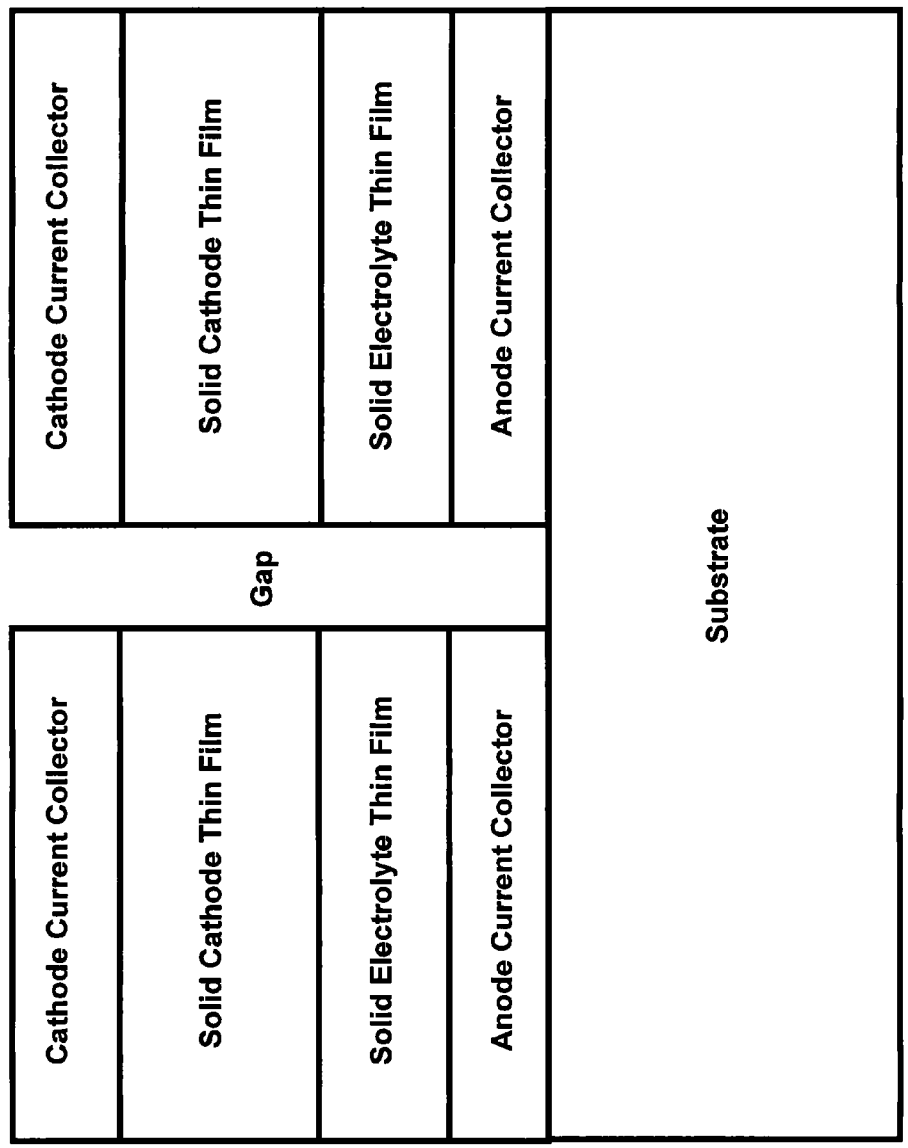
FIG. 3 is a schematic illustration of a patterned solid-state lithium microbattery structure with gaps utilized to mitigate stress.

One of the problems encountered in multilayer thin film, solid-state batteries is the stress produced in the multilayer device as the materials contract and expand on the charge/discharge cycles as lithium de-intercalates in adjacent layers. Film cracking for films greater than approximately 2-5 microns generally occurs. One embodiment for alleviating the stresses is to design patterned films, such as in a rectangular or hexagonal design, where multiple microbattery structures are deposited on a substrate with gaps between the microbattery structures to allow for stress relaxation on charge/discharge to prevent fracturing. The gaps can be filled with aluminum current collector lines to enable transport of battery current from the cells. Such a design is depicted in FIG. 3. In one embodiment, the microbattery structures have individual thicknesses of between approximately 0.1 mm to approximately 10 mm with gaps between the microbattery structures of between approximately 0.002 mm to approximately 1 mm.

Figure 4:
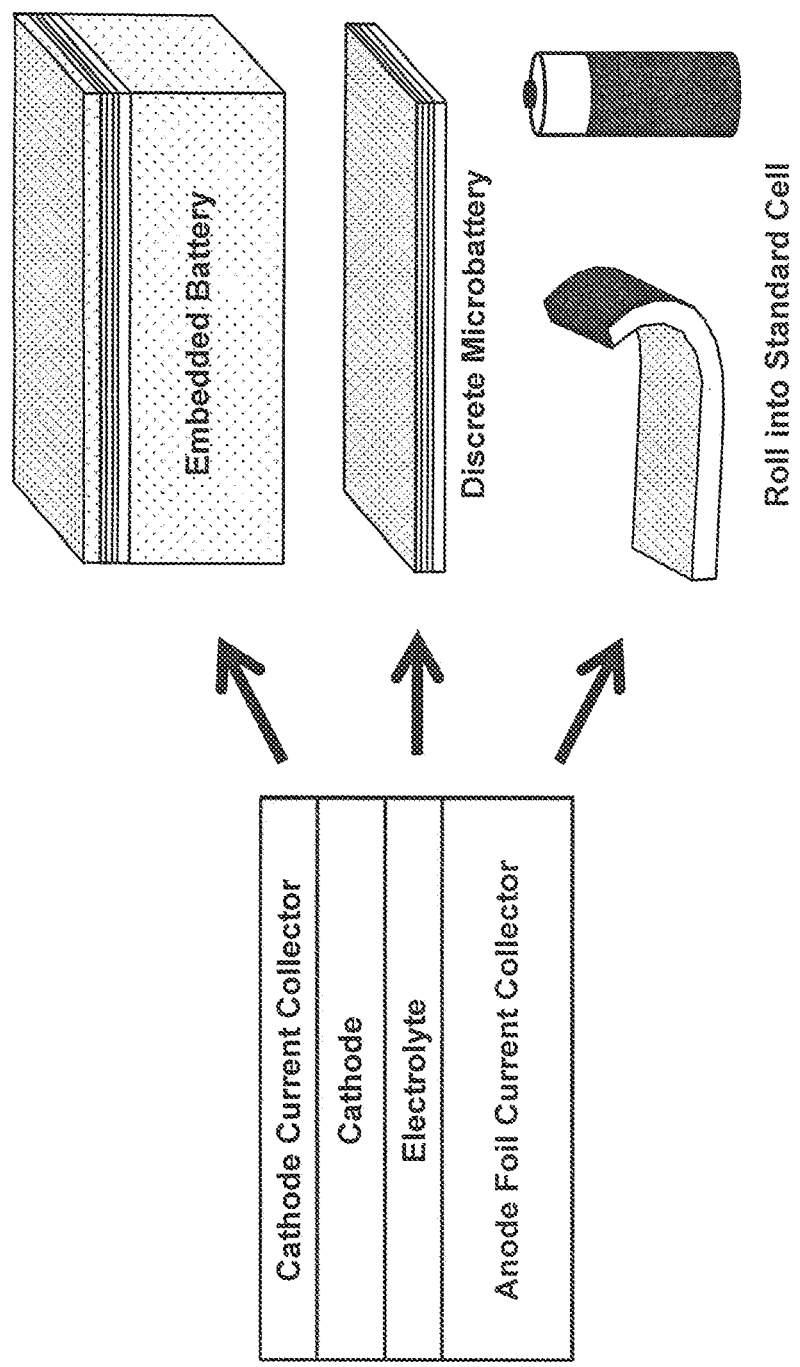
FIG. 4 is a schematic illustration of different embodiments of solid-state batteries that use a thin film electrolyte on a foil substrate.

FIG. 4 shows different embodiments of solid-state batteries that use a thin-film lithium-ion electrolyte on a flexible foil substrate. According to an embodiment of the present invention, the electrolyte is fabricated on an anode foil current collector. The battery further comprises a cathode and a cathode current collector. The electrolyte/foil of the present invention can be used in an embedded battery, a discrete microbattery, or can be rolled and used in a standard cell. As an example of the present invention, the integration of a high lithium-ion conductivity solid electrolyte, A-site deficient perovskite lanthanum lithium tantalate, with an inexpensive, flexible, lithium-metal-stable substrate, copper foil is described herein. This invention enables a large-area, mass-production method for thin film solid-state lithium-ion batteries utilizing a 'lithium-free' embodiment and displaying improved power, via higher conductivity electrolytes, compared to conventional LiPON.

Figure 5:
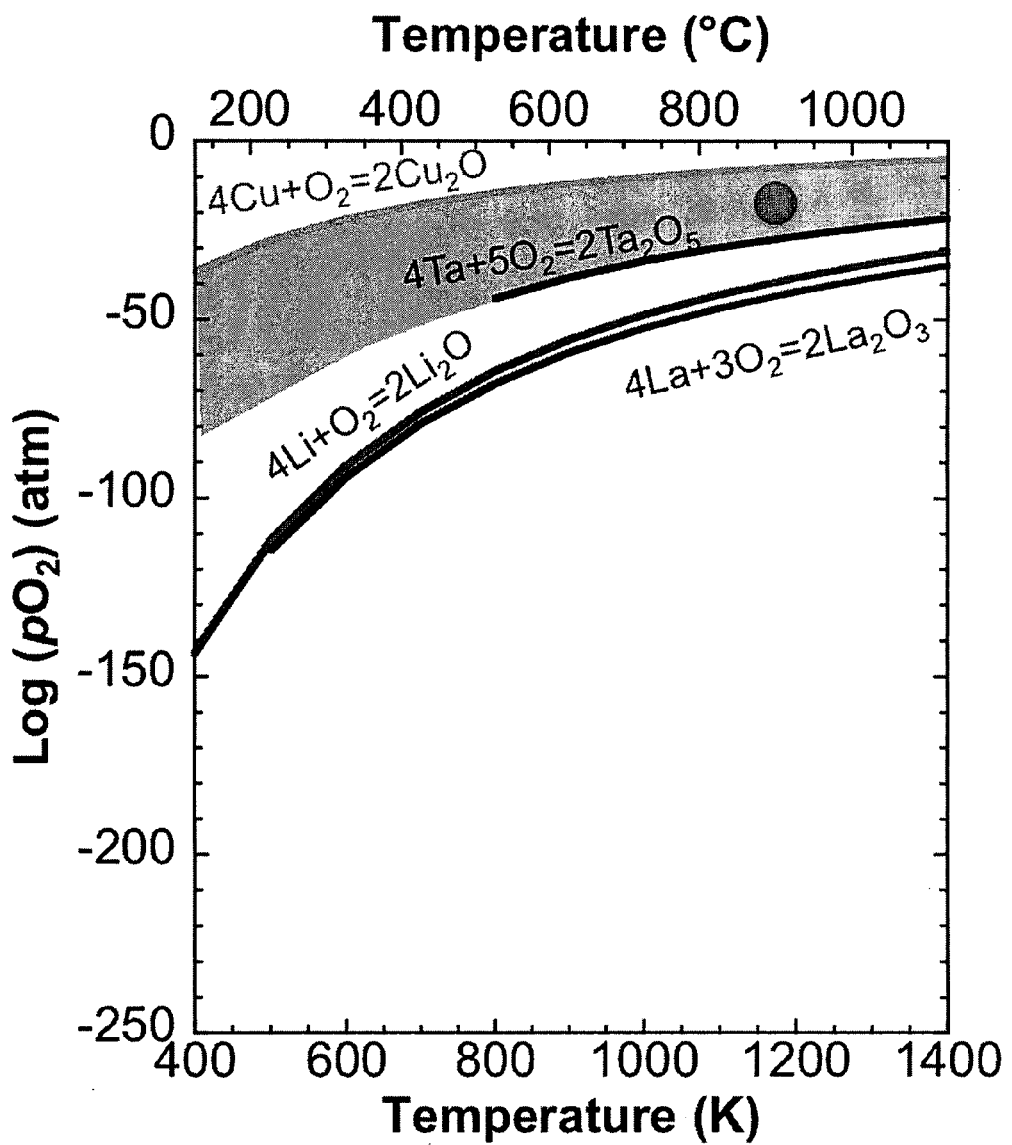
FIG. 5 is a Richardson-Ellingham diagram showing the equilibrium of metals with oxygen and their oxides as a function of temperature. The shaded region represents the phase space where lithium, lanthanum, and tantalum are oxidized and copper is reduced. The dark circle indicates the processing condition used as an example of the invention.

Processing compatibility between base-metal substrates and oxide films has previously been demonstrated for coated conductor and capacitor applications using an equilibrium controlled-atmosphere approach. See J. T. Dawley et al., *J. Mater. Res.* 17, 1678 (2002); J. T. Dawley and P. G. Clem, *Appl. Phys. Lett.* 81, 3028 (2002); J. Ihlefeld et al., *J. Electroceram.* 14, 95 (2005); B. Laughlin et al., *J. Am. Ceram. Soc.* 88, 2652 (2005); and J. M. Herbert, *Proc. IEE* 112, 1474 (1965). Through careful control of the oxygen partial pressure during the high-temperature annealing steps, a processing space where base-metal substrates remain metallic and oxide film constituents are oxidized can be found, as shown in FIG. 5 for the lithium, lanthanum, tantalum, copper, and oxygen systems. See I. Barin, *Thermochemical Data of Pure Substances*, VCH, Weinheim; New York 1995. A large processing window where lithium, lanthanum, and tantalum are stable as oxides and copper remains metallic is apparent. The fabrication of a LLTO electrolyte film on a copper foil is described below. The circle on the diagram indicates the condition in temperature-oxygen partial pressure space under which the exemplary films were processed, which is approximately 10 orders of magnitude below the copper oxidation line.

While thermodynamic stability of lanthanum lithium tantalate with copper is predicted, an added complication in processing is the oxygen partial pressure dependence of the vapor pressure of lithium oxide. See R. H. Lamoreaux and D. L. Hildenbrand, *J. Phys. Chem. Ref. Data* 13, 151 (1984). To compensate for possible lithium loss during processing, films with nominal compositions of $La_{0.3}Li_{0.1}TaO_3$ were prepared from a chemical solution method with nominal excess lithium concentrations of 10 mol percent and 20 mol percent excess, as described below.

Preparation of Exemplary LLTO Films

Lanthanum lithium tantalate solutions were prepared via a chelate chemistry based loosely on that developed for lead zirconate titanate deposition. See R. A. Assink, R. W. Schwartz, *Chem. Mat.* 5, 511 (1993). An A-site precursor solution was prepared by dissolving lithium acetate dihydrate and lanthanum acetate hydrate in a 1:2 mixture of acetic and propionic acid at room temperature. Separately a B-site precursor was prepared by chelating tantalum ethoxide with 5 equivalents of acetic acid in an argon filled glove box to prevent oxidation of the tantalum source. The A-site precursor was added to the tantalum precursor to achieve the desired stoichiometry. The solution was diluted to 0.3 M through the addition of methanol. The solution was dispensed through a 0.2 µm filter and spin cast onto 18 µm thick copper foil substrates at 3000 RPM for 30 seconds. The films were placed on a 250° C. hotplate for 10 minutes for solvent evaporation and gel consolidation. The films were then annealed to 700° C. for 30 minutes in a tube furnace with a 3% $H_2$-97% $N_2$ atmosphere that was bubbled through room temperature water. 30° C. per minute temperature ramps were used for heating and cooling within the controlled atmosphere furnace. The coating, drying, and firing procedure was repeated 5 times to increase film thickness. A final 900° C. by 30 minute crystallization anneal was performed in the same hydrogen-containing atmosphere. A furnace oxygen partial pressure was measured to be $10^{-17}$ atm with an in situ oxygen sensor. The average film thickness after firing was approximately 420 nm. Films can also be prepared via rf-magnetron sputtering from a sintered lithium lanthanum tantalate target. Conditions of 5.9 W/cm$^2$ sputter power and 20 mTorr of argon background gas have been used to deposit the lithium lanthanum tantalate on copper substrates. An anneal to 900° C. for 30 minutes in the same hydrogen-containing atmosphere can be used to crystallize the film. Lithium-ion-blocking 100 nm thick, 200 µm diameter gold top contacts were deposited via RF magnetron sputtering through a shadow mask. Electrode areas were verified via optical microscopy and image analysis. Impedance measurements were performed with impedance analyzers with a 50 mV oscillator over a frequency range from 100 Hz to 1 MHz. Room temperature to 125° C. measurements were performed on a probe station. Measurements made at 0° C. and –25° C. were performed in an environmental chamber. X-ray diffraction patterns were collected using a high-resolution diffractometer with copper Kα radiation. Transmission electron microscopy (TEM) samples were prepared via focused Ga$^+$ ion beam milling. Imaging was performed within an energy-filtering high-resolution analytical scanning transmission electron microscope. Scanning electron microscopy (SEM) images were collected within a field-emission instrument operated in in-lense mode. Rutherford backscattering spectroscopy (RBS) was performed with 2 MeV helium ions. Nuclear reaction analysis (NRA) was performed with a 1.5 MeV protons utilizing the $Li^7 + H^1$ to 2 $He^4$ exothermic nuclear reaction.

Experimental Results on LLTO Films

Figure 6:
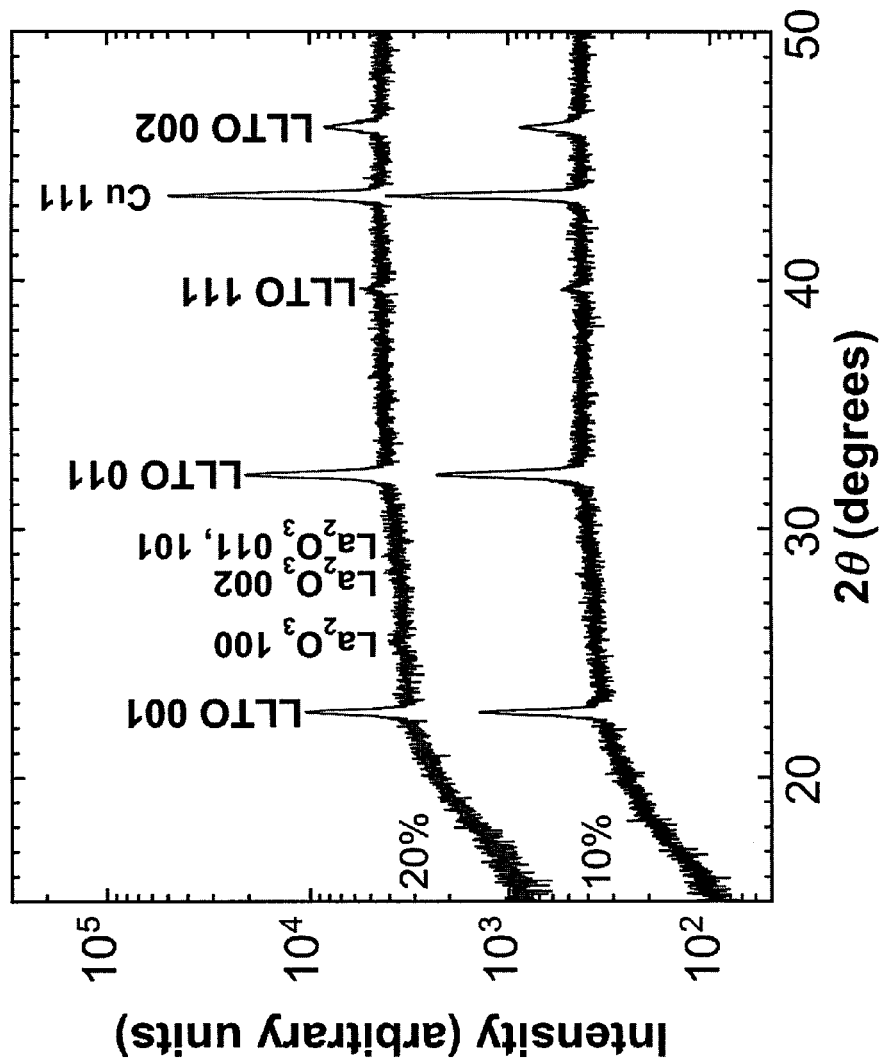
FIG. 6 shows X-ray diffraction patterns of $La_{0.3}Li_{0.1}TaO_3$ thin films processed directly on copper foil substrates nominally batched with 10 to 20 mol % excess lithium. Pseudocubic indices are labeled for the LLTO films.

FIG. 6 shows representative X-ray diffraction patterns for the LLTO films processed directly on the copper foil substrates. Peaks attributable to perovskite $La_{0.3}Li_{0.1}TaO_3$ and the copper substrate are observed with no evidence of substrate oxidation or interfacial reaction, as is expected from the thermodynamic data. Small peaks with intensity levels slightly greater than the background are observed at ca. 25.5, 28.3, and 29.1 degrees in 2-theta. These peaks are consistent with bixbyite structured $La_2O_3$ that is present in very low concentrations. No evidence of peak splitting in the perovskite phase suggestive of a tetragonal double-perovskite unit cell was observed, which suggests that these films possess a pseudocubic symmetry without significant A-site ordering. See K. Mizumoto and S. Hayashi, *J. Ceram. Soc. Jpn.* 105, 713 (1997). A Nelson-Riley extrapolation of the 001, 002, and 003 pseudocubic reflections was used to determine the lattice parameter for each film. See J. B. Nelson, D. P. Riley, *P. Phys. Soc. Lond.* 57, 160 (1945). Virtually no difference was observed between samples with values of 3.93±0.02 Å measured, similar to that expected for this stoichiometry. See K. Mizumoto and S. Hayashi, *J. Ceram. Soc. Jpn.* 106, 369 (1998).

Figure 7:
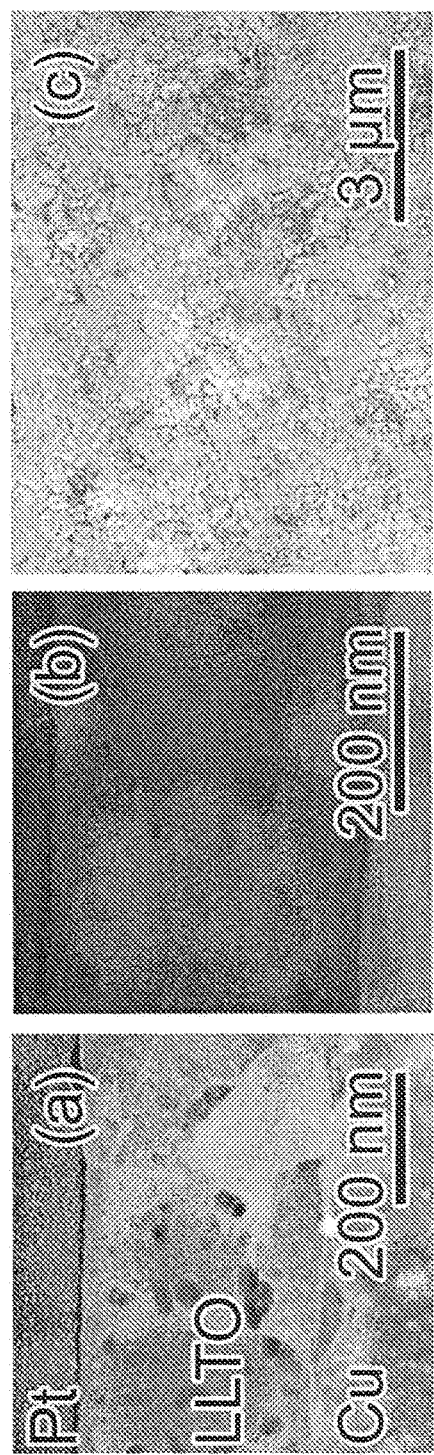
FIG. 7 shows: (a) Dark-field cross-sectional TEM image of a LLTO batched with 20% excess lithium ($La_{0.281}Li_{0.155}TaO_3$) on a copper foil substrate. (b) Cross sectional TEM-EDS map showing the lanthanum and tantalum concentration in the LLTO film and copper substrate with a chemically abrupt interface. The blue region is platinum used in the sample preparation process. (c) SEM surface image of LLTO ($La_{0.281}Li_{0.155}TaO_3$) film on a copper substrate.

To verify a clean interface between the oxide film and copper substrate, a cross-sectional TEM image and composition map is shown in FIGS. 7(a) and 7(b) for the sample batched with 20% excess lithium. The film is comprised of homogeneous equiaxed grains, averaging 185±23 nm in diameter, with many grains extending through the thickness of the film. The films possessed some closed porosity, as is observed in the cross-sectional images. The grain size and morphology were obtained by SEM as shown in FIG. 7(c), using a linear intercept grain size measurement. A dense film surface is observed, which suggests that the internal porosity developed during the multiple layer deposition steps (five subsequent layers) used to fabricate the 420 nm thick films.

Film stoichiometry was assessed using a combination of NRA for lithium concentrations, scanning TEM energy dispersive spectroscopy (EDS) for tantalum to lanthanum ratios, and RBS for lanthanum and tantalum concentrations. LiTaO$_3$ and lanthanum strontium aluminum tantalate (LSAT) single crystals were used as standards for the NRA and RBS, and EDS measurements, respectively. Lanthanum to tantalum concentration ratios were 0.31 and 0.32 with ±2% error bars, respectively, for the samples containing 10% and 20% excess lithium. Lithium content ranged from 0.147 to 0.155 with ±10% error bars for two samples. Values greater than 0.11 and 0.12 suggest that the lithium acetate dihydrate precursor was slightly dehydrated, resulting in higher than expected lithium content when batched. The lithium concentrations greater than 0.10 in reference to tantalum are consistent with the secondary phase observation in XRD and indicate that the materials have compensated for excess lithium by forming a La$_2$O$_3$ second phase that is present in very small quantities. Furthermore, if the lithium is present only in the perovskite lattice, the sample stoichiometries are Li$_{0.147}$La$_{0.284}$TaO$_3$ and Li$_{0.155}$La$_{0.281}$TaO$_3$ for the 10% excess and 20% excess lithium samples, respectively. It was noted that as the greater excess of lithium was batched, more was lost during processing (e.g. a lithium concentration greater than 0.155 in the 20% excess batched sample was expected based on the dehydrated nature of the lithium precursor). This suggests that excess lithium oxide is vaporized during high temperature processing in the low oxygen partial pressure atmosphere. No clear evidence of the secondary phase was observed in the SEM or TEM data, however the very low concentration likely obfuscates identification.

Figure 8:
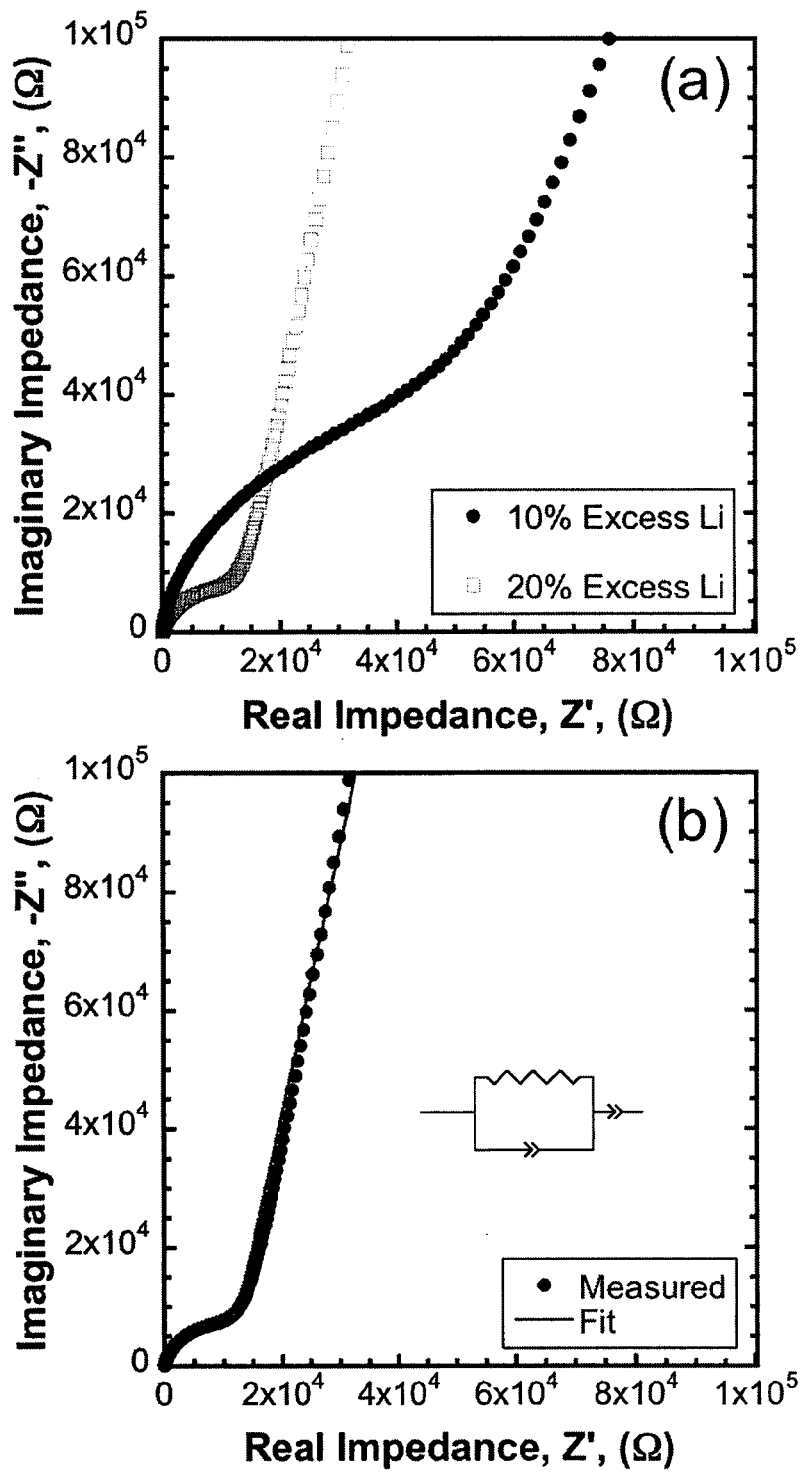
FIG. 8 is a complex-plane impedance spectra collected at room temperature for Au/LLTO/Cu structures with nominally 10% and 20% excess lithium (a) and (b) data collected for a 20 mol % excess lithium sample ($La_{0.281}Li_{0.155}TaO_3$) and modeled fit. Inset shows circuit elements used for the modeled fit.

Ionic conductivity was assessed using electrochemical impedance spectroscopy. Lithium-ion-blocking gold contacts approximately 200 μm in diameter and 100 nm in thickness were deposited through a shadow mask via rf magnetron sputtering on top of the films forming a gold/LLTO/copper structure. Typical complex plane impedance plots are shown in FIG. 8(a) for both samples. A dependence of impedance response on stoichiometry is observed, with the 20% excess sample showing the lowest impedance. This is consistent with the expected Li:La ratio dependence of lithium ion conductivity in these materials where the highest ionic conductivity has been observed for a Li$_{0.18}$La$_{0.27}$TaO$_3$ composition. See K. Mizumoto and S. Hayashi, *J. Ceram. Soc. Jpn.* 106, 369 (1998). The impedance response of the nominally 20% excess lithium sample is shown in the lower impedance region, emphasizing the resistor-capacitor (RC) arc and transition to a blocking spur in FIG. 8(b). The impedance response was modeled with LEVM software with the fitting circuit is shown in FIG. 8(b). See LEVM, Ver. 8.10, J. R. Macdonald. Briefly, a single ZARC element (resistor in parallel with a constant phase element) was used to fit the high-frequency arc and a constant phase element was used to fit the low frequency spur. These circuit elements are consistent with those typically used for polycrystalline solid electrolytes with rough electrode/electrolyte interfaces. See J. R. Macdonald, *Solid State Ionics* 13, 147 (1984). As shown above, the films are one to two grains in thickness, which minimizes grain boundary contribution to the response and results in the single ZARC element. The resistance in value in ZARC was 1.07×10$^3$ Ohms, which was used to determine the conductivity. The room temperature lithium-ion conductivity was determined to be 1.5×10$^{-5}$ S cm$^{-1}$. This value compares favorably with the intra-grain value measured on bulk ceramics of similar compositions and indicates that bulk-like response is possible in thin layers. See K. Mizumoto and S. Hayashi, *J. Ceram. Soc. Jpn.* 106, 369 (1998).

Impedance spectra were collected over the temperature range of −25° C. to 125° C. at 25° C. increments for the sample nominally batched with 20% excess lithium to assess the temperature dependence of conductivity. Individual impedance spectra were fit with the equivalent circuit described above to determine the conductivities. Results are shown in an Arrhenius plot in FIG. 9. The temperature dependence of conductivity was fit with an Arrhenius equation:

$$\sigma T = \sigma_0 \exp\left(\frac{-E_a}{kT}\right) \qquad (1)$$

Figure 9:
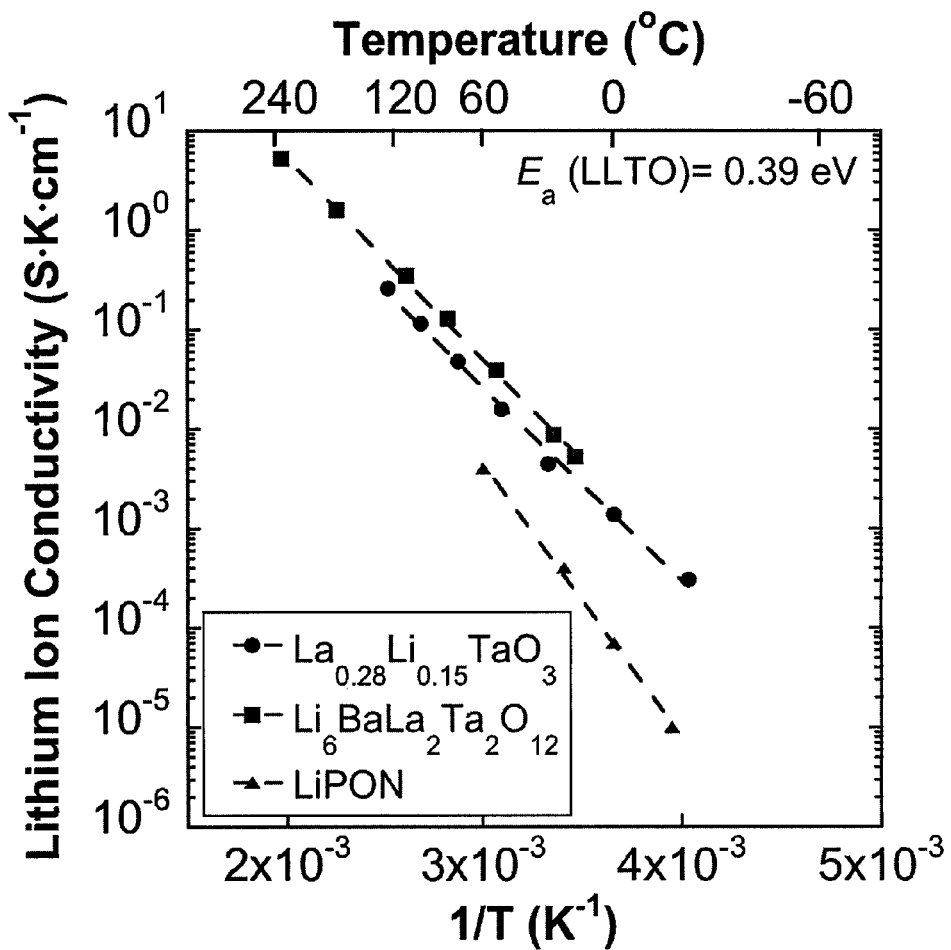
FIG. 9 is an Arrhenius plot for the lithium-ion conductivity of $La_{0.281}Li_{0.155}TaO_3$ compared with data for $Li_6BaLa_2Ta_2O_{12}$ and LiPON. An activation energy of 0.39 eV was measured for the LLTO film.

An activation energy for lithium ion conduction of 0.39 eV was measured with a pre-factor of 1.7×10$^3$ K S cm$^{-1}$. The activation energy value is similar to that obtained for bulk ceramic perovskite-structured lanthanum lithium tantalates and niobates. See K. Mizumoto and S. Hayashi, *J. Ceram. Soc. Jpn.* 106, 369 (1998); K. Mizumoto and S. Hayashi, *Solid State Ionics* 116, 263 (1999); K. Mizumoto and S. Hayashi, *Solid State Ionics* 127, 241 (2000); and K. Y. Yang and K. Z. Fung, *J. Phys. Chem. Solids* 69, 393 (2008). Temperature dependent ionic conductivities of several other reversible lithium-ion solid electrolytes are shown in FIG. 9. The performance of the perovskite LLTO thin film electrolyte on a copper substrate compares favorably with other candidate electrolyte materials, with values nearly equivalent to the recently investigated doped lithium lanthanum tantalate garnets and substantially greater conductivities than LiPON. See V. Thangadurai and W. Weppner, *Adv. Funct. Mater.* 15, 107 (2005); and X. H. Yu et al., *J. Electrochem. Soc.* 144, 524 (1997).

The present invention has been described as a solid-state lithium battery and a method for lithium-ion electrolyte thin film fabrication. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for fabricating a lanthanum lithium tantalate electrolyte layer on a metal substrate, comprising:
   depositing a precursor lanthanium lithium tantalate film on a metal substrate; and
   annealing the film at a crystallization temperature and oxygen partial pressure sufficiently high that the lanthanum, lithium, and tantalum are stable as oxides but low enough that the metal substrate remains metallic to provide a lanthanum lithium tantalate electrolyte layer on a metal substrate.

2. The method of claim 1, wherein the depositing step comprises a chemical solution method.

3. The method of claim 2, wherein the chemical solution method comprises:
    mixing an A-site precursor solution and a B-site precursor solution,
    spin-casting the mixture on the metal substrate, and
    evaporating the solvent.

4. The method of claim 1, wherein the depositing step comprises sputtering.

5. The method of claim 1, wherein the precursor lanthanium lithium tantalate film comprises excess lithium to compensate for lithium loss during the annealing step.

6. The method of claim 1, wherein the lanthanium lithium tantalate electrolyte layer comprises perovskite lanthanum lithium tantalate.

7. The method of claim 6, wherein the perovskite lanthanium lithium tantalate comprises $La_{1/3-x}Li_{3x}TaO_3$.

8. The method of claim 1, wherein the metal substrate comprises copper or nickel.

9. The method of claim 1, wherein the crystallization temperature is greater than 500° C.

10. The method of claim 8, wherein the crystallization temperature is greater than 900° C.

* * * * *